United States Patent
Coleman et al.

(10) Patent No.: US 6,473,967 B1
(45) Date of Patent: Nov. 5, 2002

(54) METHOD FOR PRODUCING A FABRICATED VEHICLE WHEEL

(75) Inventors: Alan W. Coleman, Southgate, MI (US); Ricky L. VanSickle, Perry, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 15 days.

(21) Appl. No.: 09/664,654

(22) Filed: Sep. 19, 2000

(51) Int. Cl.$^7$ ................................................ B23P 17/00
(52) U.S. Cl. ............................ 29/894.322; 29/894.325; 301/63.101; 301/63.106
(58) Field of Search ..................... 29/894.323, 894.325, 29/894.322; 301/63.101–63.108

(56) References Cited

U.S. PATENT DOCUMENTS

| | | | |
|---|---|---|---|
| 1,651,111 A | * | 11/1927 | Winter |
| 2,133,144 A | * | 10/1938 | Johnson |
| 2,299,998 A | * | 10/1942 | Le Jeune |
| 3,210,126 A | * | 10/1965 | Travers |
| 5,295,304 A | | 3/1994 | Ashley, Jr. |
| 5,345,676 A | | 9/1994 | Ashley, Jr. |
| 5,634,271 A | * | 6/1997 | Lipper |
| 5,694,687 A | | 12/1997 | Coleman |
| 5,951,114 A | * | 9/1999 | Marron et al. |

* cited by examiner

Primary Examiner—P. W. Echols
(74) Attorney, Agent, or Firm—MacMillan, Sobanski & Todd, LLC

(57) ABSTRACT

An improved method for forming a vehicle wheel includes the steps of steps of: (a) providing a wheel rim defining a rim axis and including a generally axially extending well portion and a pair of opposed ends, one of the ends including an inboard tire bead seat retaining flange and an inboard tire bead seat, and the other end including an outboard tire bead seat; (b) providing a generally circular wheel disc blank defining a disc axis, the disc blank including an inner annular wheel mounting portion and an outer annular portion; (c) subjecting the wheel disc blank to a series of metal forming operations to produce a finished disc having a final profile, the finished wheel disc having an outer annular portion, an inner annular wheel mounting portion, and an intermediate portion having a generally convex profile; and (d) joining the finished wheel disc to the wheel rim to produce a fabricated vehicle wheel.

16 Claims, 14 Drawing Sheets

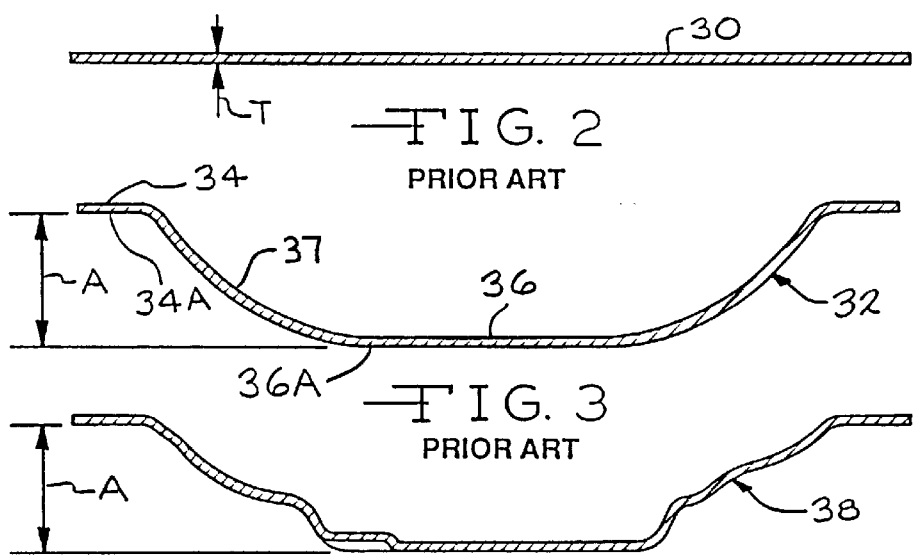
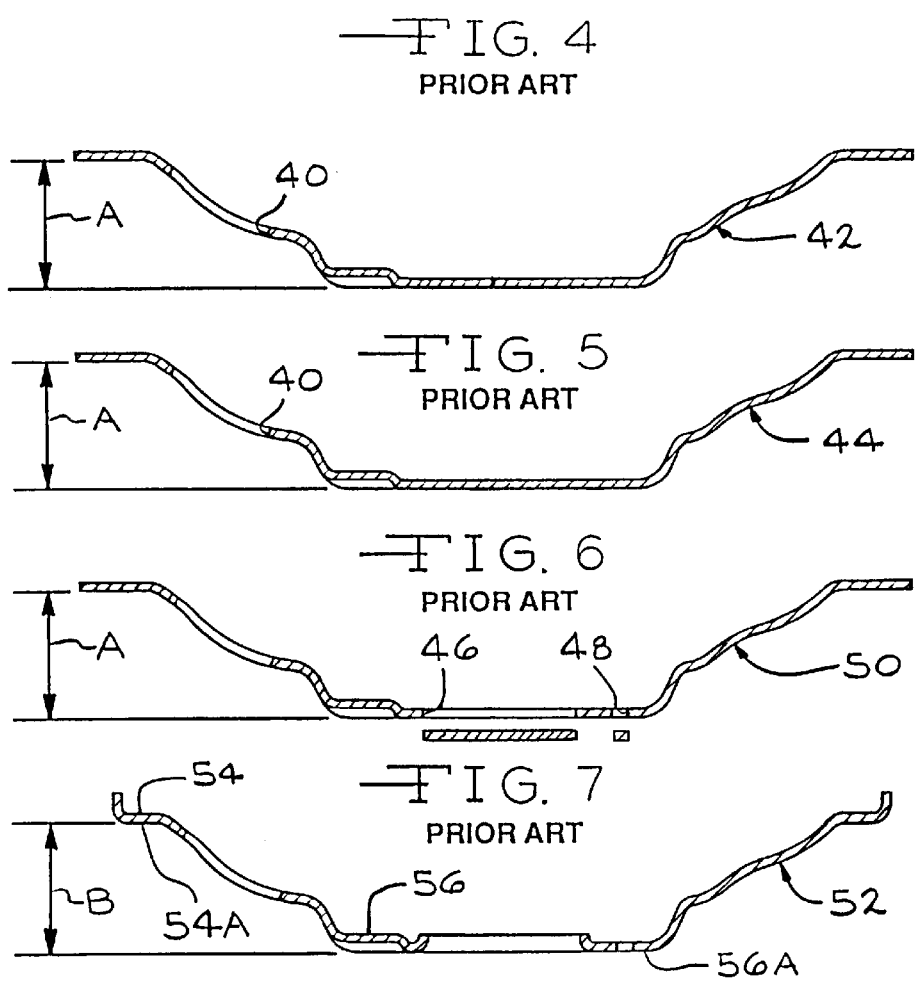

METHOD FOR PRODUCING A FABRICATED VEHICLE WHEEL

BACKGROUND OF THE INVENTION

This invention relates in general to vehicle wheels and in particular to an improved method for producing a fabricated vehicle wheel.

A conventional fabricated vehicle wheel is typically of a two-piece construction and includes an inner disc and an outer "full" rim. The disc can be cast, forged, or fabricated from steel, aluminum, or other alloys, and includes an inner annular wheel mounting portion and an outer annular portion. The wheel mounting portion defines an inboard mounting surface and includes a center pilot or hub hole, and a plurality of lug receiving holes formed therethrough for mounting the wheel to an axle of the vehicle. The rim is fabricated from steel, aluminum, or other alloys, and includes an inboard tire bead seat retaining flange, an inboard tire bead seat, an axially extending well, an outboard tire bead seat, and an outboard tire bead seat retaining flange. In some instances, a threepiece wheel construction having a mounting cup secured to the disc is used. In both types of constructions, the outer annular portion of the disc is secured to the rim by welding.

A full face fabricated wheel is distinguished from other types of fabricated wheels by having a one-piece wheel disc construction. In particular, the full face wheel includes a "full face" disc and a "partial" rim. The full face disc can be formed cast, forged, or fabricated from steel, aluminum, or other alloys. The full face disc includes an inner annular wheel mounting portion and an outer annular portion which defines at least a portion of an outboard tire bead seat retaining flange of the wheel. The wheel mounting portion defines an inboard mounting surface and includes a center pilot or hub hole, and a plurality of lug receiving holes formed therethrough for mounting the wheel to an axle of the vehicle. The partial rim is fabricated from steel, aluminum, or other alloys, and includes an inboard tire bead seat retaining flange, an inboard tire bead seat, an axially extending well, and an outboard tire bead seat. In some instances, the outboard tire bead seat of the rim and the outer annular portion of the disc cooperate to form the outboard tire bead seat retaining flange of the full face wheel. In both types of constructions, the outboard tire bead seat of the rim is positioned adjacent the outer annular portion of the disc and a weld is applied to secure the rim and the disc together.

SUMMARY OF THE INVENTION

This invention relates to an improved method for forming a vehicle wheel and includes the steps of: (a) providing a wheel rim defining a rim axis and including a generally axially extending well portion and a pair of opposed ends, one of the ends including an inboard tire bead seat retaining flange and an inboard tire bead seat, and the other end including an outboard tire bead seat; (b) providing a generally circular wheel disc blank defining a disc axis, the disc blank including an inner annular wheel mounting portion and an outer annular portion; (c) subjecting the wheel disc blank to a series of metal forming operations to produce a finished disc having a final profile, the finished wheel disc having an outer annular portion, an inner annular wheel mounting portion, and an intermediate portion having a generally convex profile; and (d) joining the finished wheel disc to the wheel rim to produce a fabricated vehicle wheel.

Other advantages of this invention will become apparent to those skilled in the art from the following detailed description of the preferred embodiments, when read in light of the accompanying drawings.

BRIEF DESCRIPTION OF THE DRAWINGS

FIG. 2 is a cross sectional view of a disc blank for use in producing the prior art fabricated steel vehicle wheel.

FIG. 3 is a cross sectional view showing the initial stamping of the disc blank into a generally bowl shaped wheel disc.

FIG. 4 is a cross sectional view showing the intermediate stamping of the bowl shaped disc to produce a partially formed wheel disc.

FIG. 5 is a cross sectional view showing the forming of the windows in the partially formed wheel disc.

FIG. 6 is a cross sectional view showing the trimming of the outer diameter of the partially formed wheel disc.

FIG. 7 is a cross sectional view showing the forming of the hub hole and lug bolt mounting holes in the partially formed wheel disc.

FIG. 8 is a cross sectional view showing the final stamping of the partially formed wheel disc to produce a finished prior art full face fabricated steel wheel disc.

DESCRIPTION OF THE PREFERRED EMBODIMENTS

Figure 1:
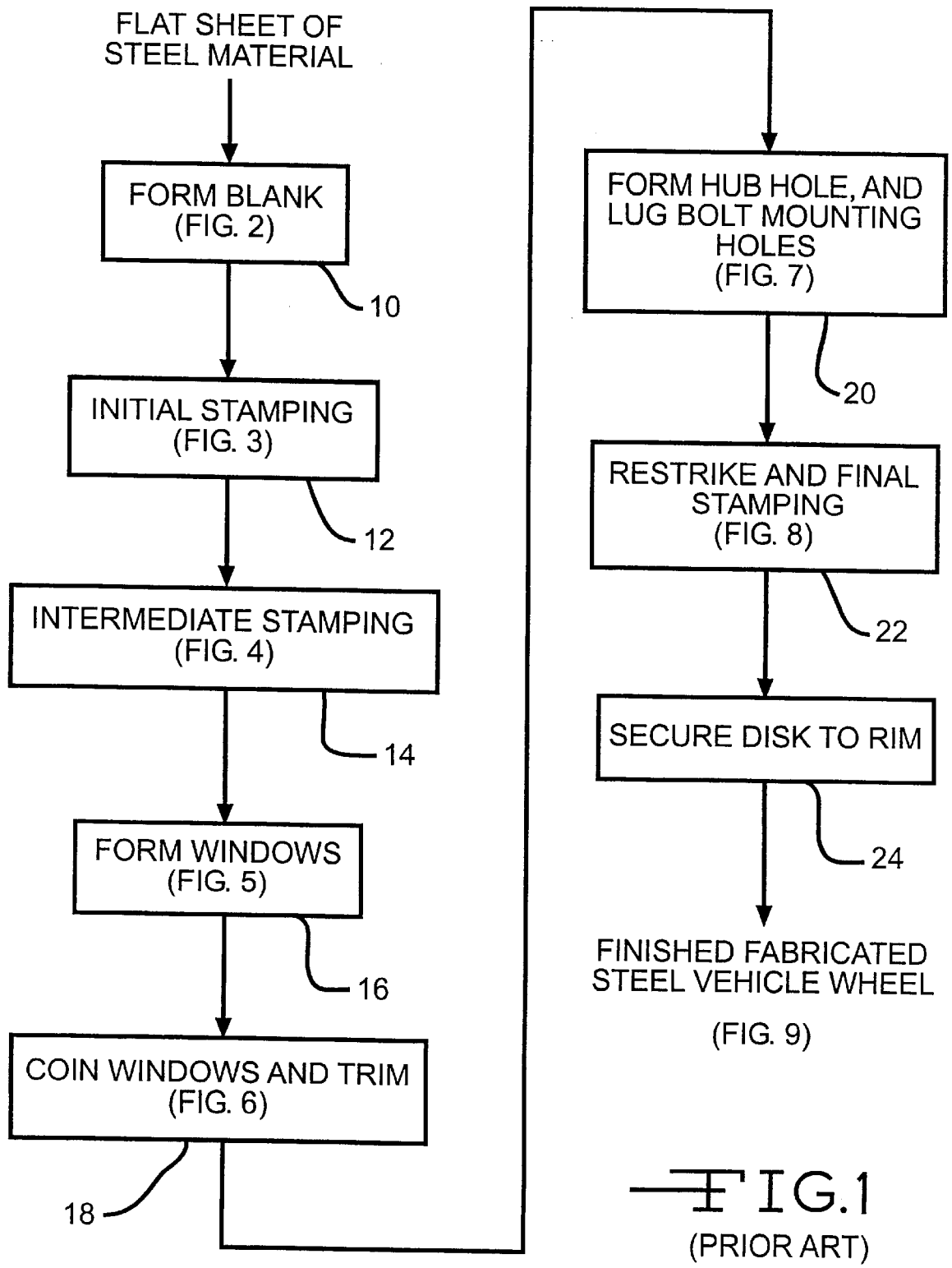
FIG. 1 is a block diagram illustrating a prior art sequence of steps for producing a prior art full face fabricated steel vehicle wheel.
Figure 9:
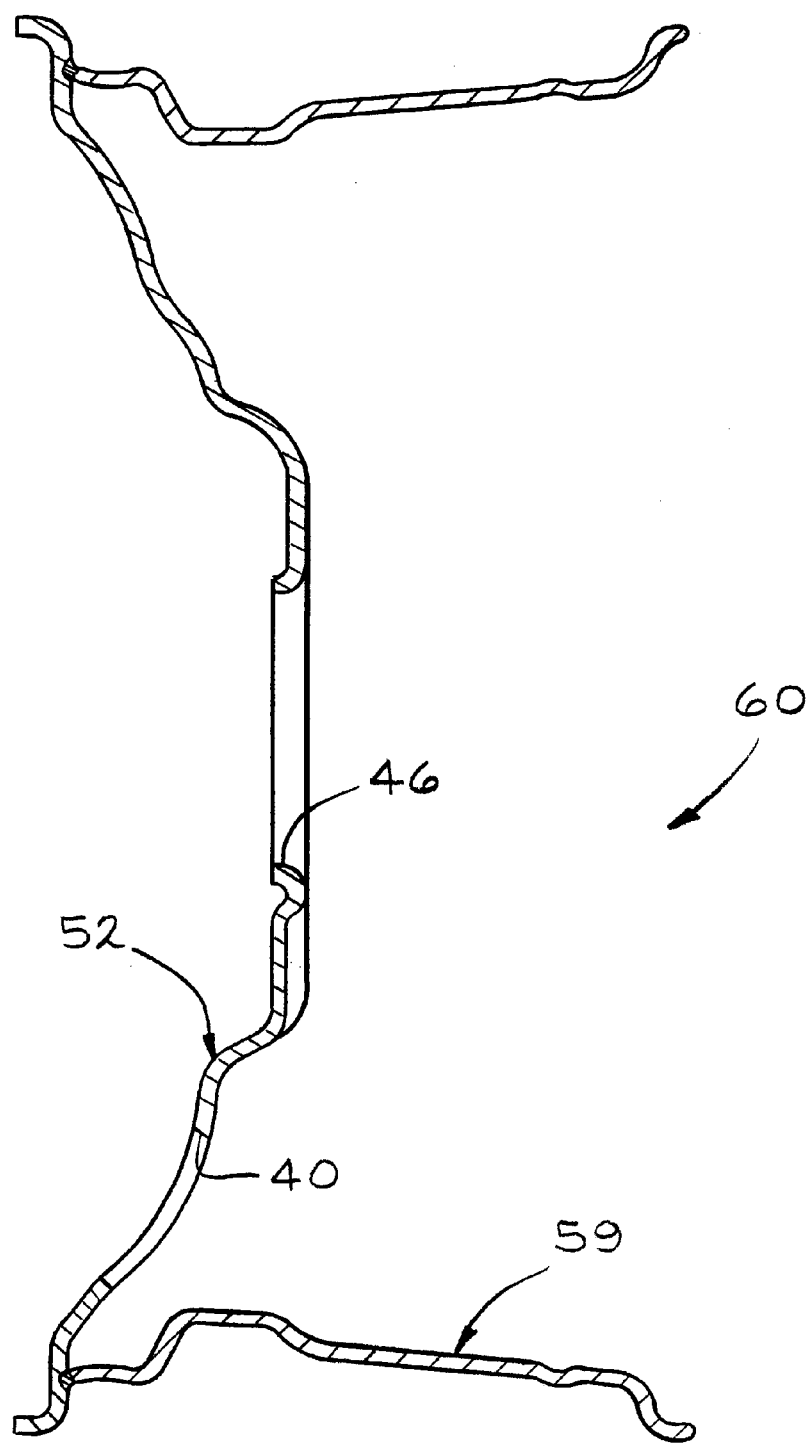
FIG. 9 is a sectional view of a prior art full face fabricated steel vehicle wheel.

Referring now to the drawings, FIG. 1 illustrates a block diagram showing a prior art sequence of steps for producing a fill face fabricated steel vehicle wheel, indicated generally at 60 in FIG. 9. Initially, in step 10, a flat sheet of steel material (not shown) is formed into a disc blank 30, shown in FIG. 2. The disc blank defines a generally uniform disc thickness T. Following this, the disc blank 30 is initially stamped in step 12 to produce a generally bowl shaped disc 32, shown in FIG. 3. The bowl-shaped disc 32 includes an outer annular portion 34, an inner annular wheel mounting portion 36 having a "flattened" bottom, and an intermediate portion 37 having a generally concave profile. In particular, during the initial stamping operation of step 12, the disc blank 30 is stamped to define a first predetermined axial distance A defined between an inner surface 34A of the outer annular portion 34 and an inner surface 36A of the inner mounting portion 36. Alternatively, in step 12, the disc blank 30 can be stamped to produce an intermediate portion 37 having a generally straight profile (not shown).

The bowl-shaped disc 32 is then stamped into a partially formed disc 38 having a predetermined profile, shown in FIG. 4, during step 14. Next, during step 16, a plurality of windows 40 (only one window illustrated in FIG. 5) are formed in the disc 38 to produce a partially formed disc 42. Following this, the windows 40 are coined and an outer edge of the partially formed disc 42 is trimmed to a predetermined diameter during step 18 to produce a partially formed disc 44 shown in FIG. 6. Next, in step 20, a center hub hole 46 and a plurality of lug bolt mounting holes 48 (only one hole 48 is illustrated) are formed in the disc 44 to produce a partially formed disc 50 shown in FIG. 7. Following this, the partially formed disc 50 is restriked and then subjected to a final stamping operation during step 22 to produce a finished full face steel wheel disc 52 shown in FIG. 8. During step 22, a second predetermined axial distance B is defined between an inner surface 54A of an outer annular portion 54 of the disc 50 and an inner surface 56A of an inner mounting portion 56 of the disc 52. In the illustrated embodiment, the second predetermined axial distance B is less than the first predetermined axial distance A. Alternatively, the second predetermined axial distance B can be equal to the first predetermined axial distance A. Following this, the full face disc 52 is secured to a partial steel wheel rim 59 during step 24 to produce the finished full face fabricated steel vehicle wheel 60 shown in FIG. 9. Thus, in a conventional prior art steel full face wheel disc application, the initial stamping operation of step 12 is operative to form a bowl-shaped disc 32 having a finished part "tread" depth (i.e., axial distances A and B are the same) or deeper (i.e., axial distance A greater than axial distance B). Also, in a conventional prior art steel full face wheel disc application the initial stamping operation of step 12 is operative to form a bowl-shaped disc 32 wherein the intermediate portion 37 has a generally concave bowl wall surface (as shown in FIG. 3), or alternatively, a generally straight bowl wall surface (not shown).

Figure 10:
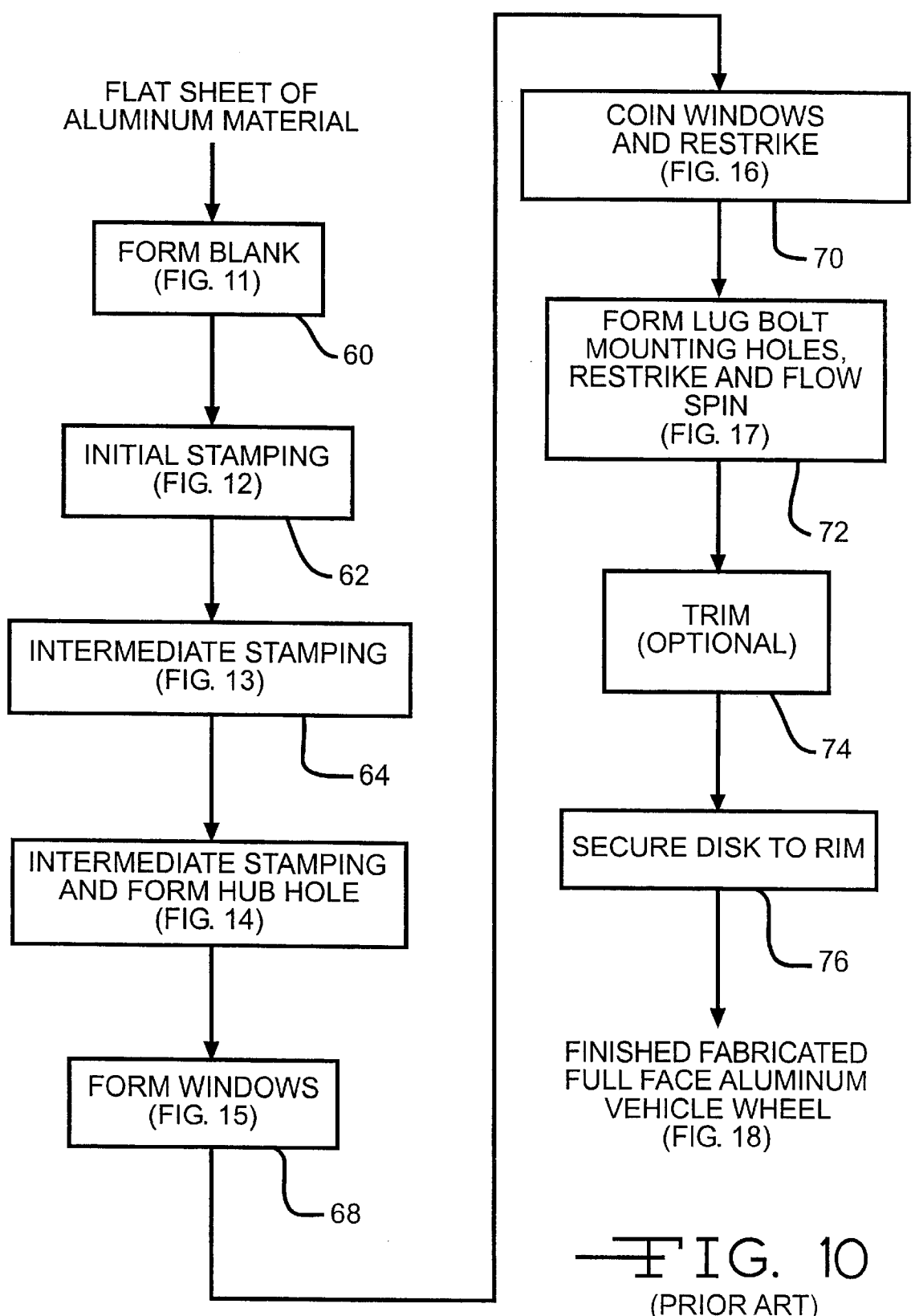
FIG. 10 is a block diagram illustrating a sequence of steps for producing a prior art full face fabricated aluminum vehicle wheel.
Figure 11:
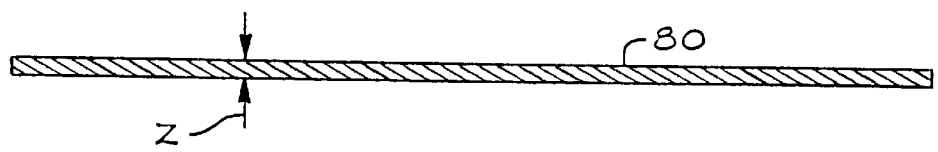
FIG. 11 is a cross sectional view of the disc blank for use in producing the prior art full face fabricated aluminum vehicle wheel.
Figure 12:
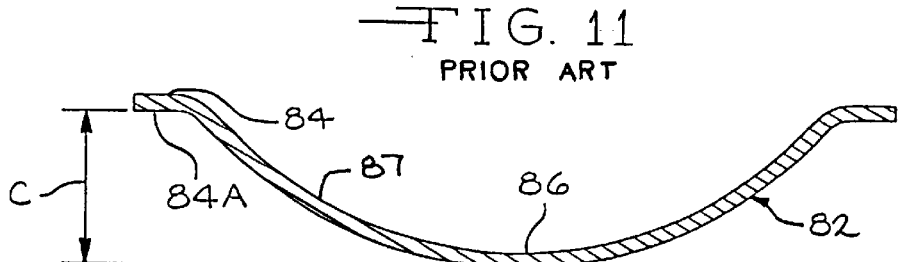
FIG. 12 is a cross sectional view showing the initial stamping of the disc blank into a generally salad bowl shaped wheel disc.
Figure 18:
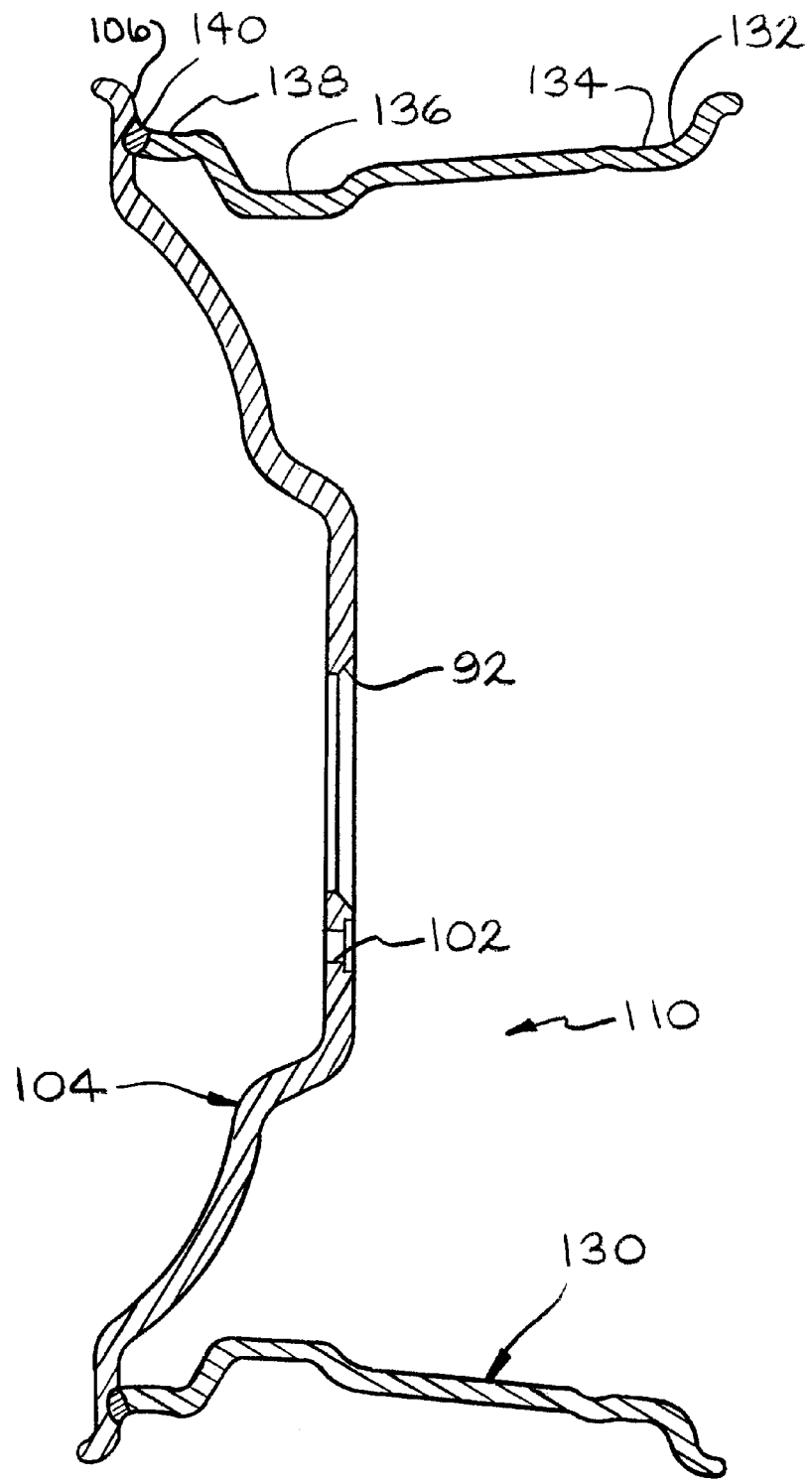
FIG. 18 is a sectional view of the prior art full face fabricated aluminum vehicle wheel.

Referring now to FIG. 10, there is illustrated a block diagram showing a prior art sequence of steps for producing a full face fabricated aluminum vehicle wheel, indicated generally at 110 in FIG. 18. Initially, in step 60, a flat sheet of aluminum material (not shown) is formed into a disc blank 80, shown in FIG. 11. The disc blank 80 defines a generally uniform disc thickness Z. Following this, the disc blank 80 is initially stamped in step 62 to produce a generally "salad" bowl-shaped disc 82, shown in FIG. 12. The salad bowl-shaped disc 82 includes an outer annular portion 84, an inner annular portion 86, and an intermediate portion 87 having a generally concave profile. In particular, during the initial stamping operation of step 62, a first predetermined axial distance C is defined between an inner surface 84A of the outer annular portion 84 and an inner is surface 86A of the inner annular portion 86 of the disc 82. Alternatively, in step 62, the intermediate portion 87 can have a generally straight profile (not shown).

Figure 13:
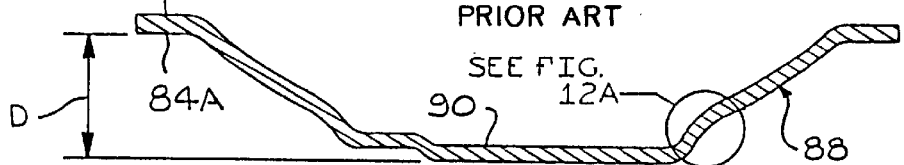
FIG. 13 is a cross sectional view showing the intermediate stamping of the salad bowl shaped disc to produce a partially formed wheel disc.

The salad bowl-shaped disc 82 is then stamped into a partially formed disc 88 having a predetermined profile, as shown in FIG. 13, during step 64. The partially formed disc 88 includes an inner annular wheel mounting portion 90 having a "flattened" bottom. During step 64, a predetermined second axial distance D is defined between the inner surface 84A of the outer annular portion 84 and an inner surface 90A of the inner annular wheel mounting portion 90. As illustrated, the second predetermined axial distance D is less than the first predetermined axial distance C. Alternatively, during step 62, a slight flattening of the inner annular portion 86 can occur. However, it is not possible to flatten the inner annular portion 86 of the aluminum blank 80 to the shape shown in FIG. 3 when using a steel blank 30.

Figure 14:
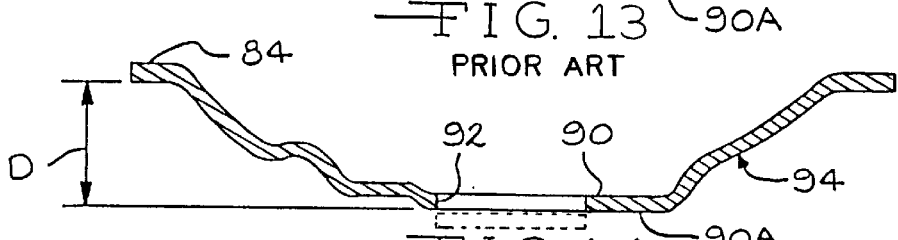
FIG. 14 is a cross sectional view showing the intermediate stamping and the forming of the hub hole in the partially formed wheel disc.
Figure 15:
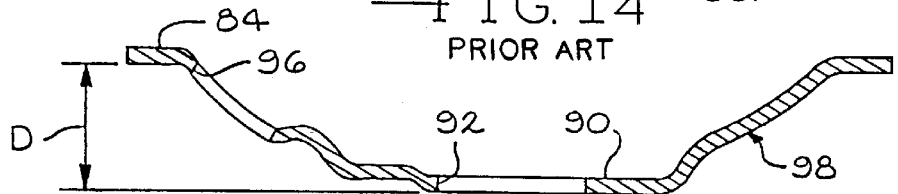
FIG. 15 is a cross sectional view showing the forming of the windows in the partially formed wheel disc.
Figure 16:
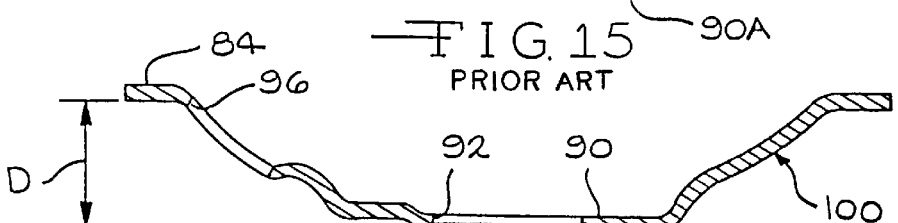
FIG. 16 is a cross sectional view showing the coining of the back side of the windows and the restriking of the hub hole in the partially formed wheel disc.

Next, during step 66, the partially formed wheel disc 88 is subjected to a further stamping operation and a center hub hole 92 is formed in the wheel disc 88 to produce a partially formed wheel disc 94 shown in FIG. 14. Following this, a plurality of windows 96 (only one window is illustrated in FIG. 15) are formed in the partially formed disc 94 during step 68 to produce a partially formed wheel disc 98. In step 70, the windows 96 are coined and the wheel disc 98 is restriked to produce a partially formed wheel disc 100 shown in FIG. 16.

Figure 17:
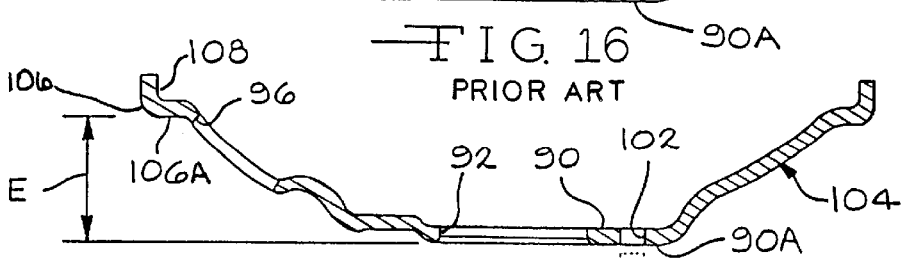
FIG. 17 is a cross sectional view showing the forming of the lug bolt mounting holes, the restriking of the wheel disc, and the flow spinning of the partially formed wheel disc in order to produce a finished prior art full face fabricated aluminum wheel disc.

Next, in step 72, a plurality of lug bolt mounting holes 102 (only one hole 102 is illustrated in FIG. 17) are formed in the wheel disc 100, the wheel disc 100 is restriked, and then the wheel disc 100 is preferably subjected to a final flow spinning operation to produce a finished full face aluminum wheel disc 104 shown in FIG. 17. In particular, during the restriking operation of step 72, a predetermined third axial distance E is defined between an inner surface 106A of an outer annular portion 106 and the inner surface 90A of the inner mounting portion 90. In the illustrated embodiment, the predetermined third axial distance E is less than the predetermined second axial distance D. Alternatively, the second axial distance D and the third axial distance E can be generally equal to one another. Also, during the flow spinning step 72, a slight thinning of the material may occur (not shown). The radially outwardly extending outer annular end portion 106 of the wheel disc 104 defines the outboard tire bead seat retaining flange of the full face fabricated vehicle wheel 110.

Next, in optional step 74, an outer end portion 108 of the outboard tire bead seat retaining flange 106 is subjected to a trimming operation to provide a smooth tire flange radius. Alternatively, the disc wheel 102 may be subjected to a final stamping operation in step 72 instead of the flow spinning operation. When the disc 102 is subjected to a final stamping operation in step 72, the trimming operation of optional step 74 is usually performed.

Following this, the finished fill face aluminum wheel disc 104 is secured to a partial aluminum wheel rim 130, shown in FIG. 18, having a predetermined shape in step 76. As shown therein, the wheel rim 130 includes an inboard tire bead seat retaining flange 132, an inboard tire bead seat 134, a generally axially extending well 136, and an outboard tire bead seat 138. In particular, during step 76, the outboard tire bead seat 138 of the rim 130 is positioned adjacent the outboard tire bead seat retaining flange 106 of the disc 104, and a circumferentially extending continuous, air-tight weld 140 is applied to secure the wheel rim 130 and wheel disc 104 together to produce the finished full face fabricated aluminum vehicle wheel 110.

Figure 19:
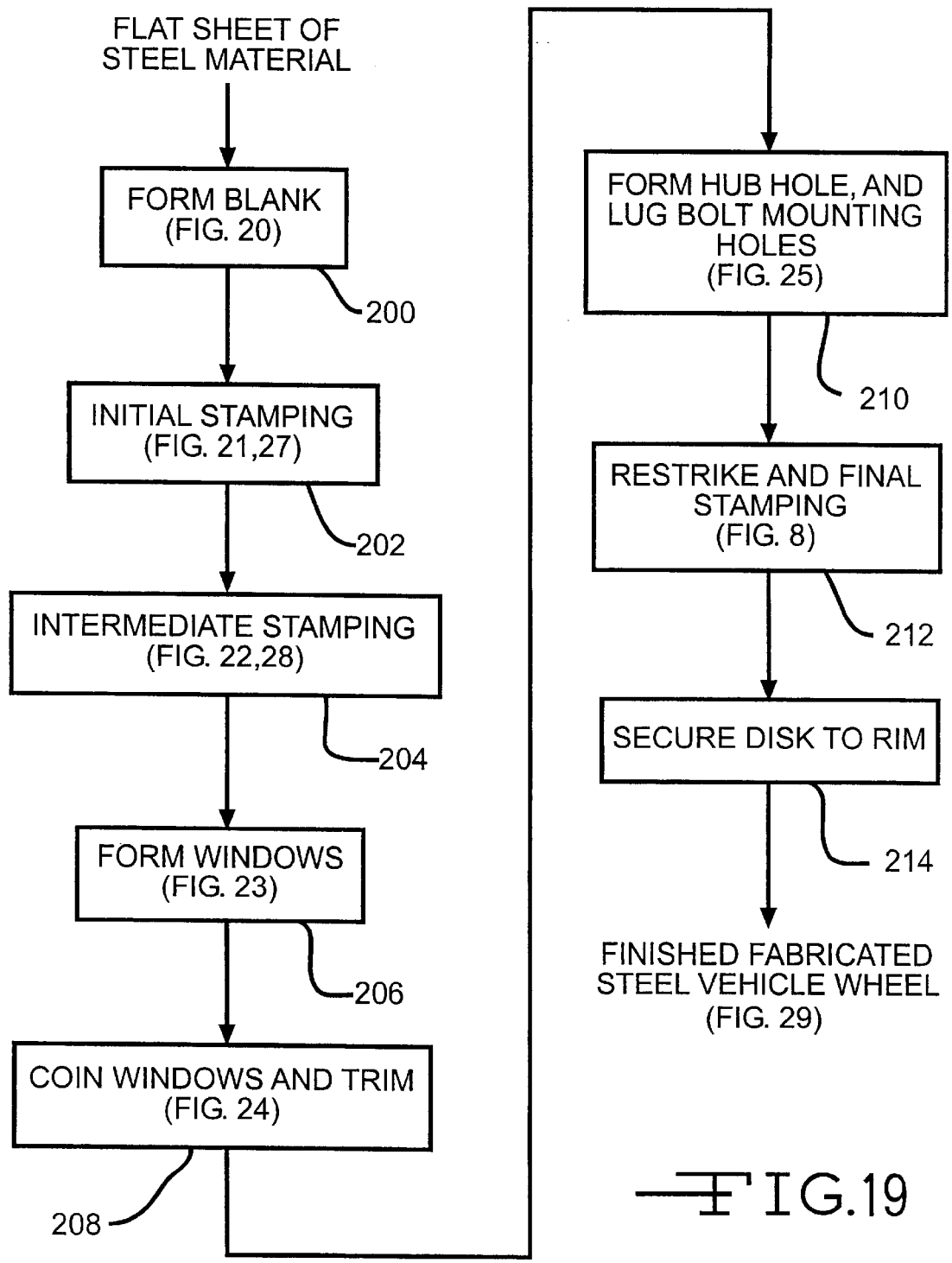
FIG. 19 is a block diagram illustrating a sequence of steps for producing a full face fabricated steel vehicle wheel in accordance with the present invention.

Referring now to FIG. 19, there is illustrated a block diagram showing a sequence of steps for producing a first embodiment of a fabricated vehicle wheel in accordance with the present invention. The vehicle wheel produced according to this sequence of steps is illustrated as being a full face fabricated steel vehicle wheel, indicated generally at 278 in FIG. 29. However, it will be appreciated that the present invention can be used in conjunction with other types of fabricated vehicle wheels having a steel wheel disc. For example, the vehicle wheel can be a "bead seat attached" wheel (such as shown in FIG. 4 of U.S. Pat. No. 5,188,429 to Heck et al.), a "well attached" wheel (such as shown in FIG. 3 of Heck et al.), or a "modular wheel" construction including a "partial" rim and a full face wheel disc (such as shown in U.S. Pat. No. 5,360,261 to Archibald et al.), all of these patents incorporated herein by reference.

Figure 20:
FIG. 20 is a cross sectional view of a disc blank for use in producing the full face fabricated steel vehicle wheel in accordance with this invention.
Figure 21:
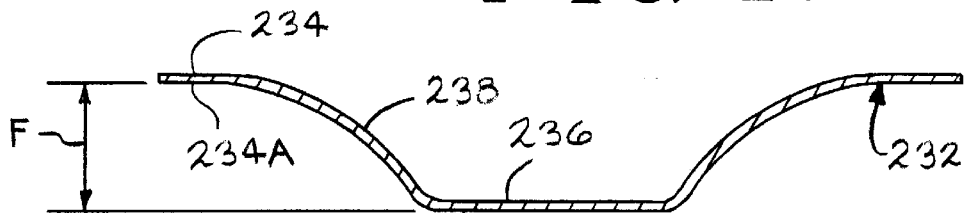
FIG. 21 is a cross sectional view showing the initial stamping of the disc blank into a generally bulge bowl shaped wheel disc in accordance with this invention.
Figure 27:
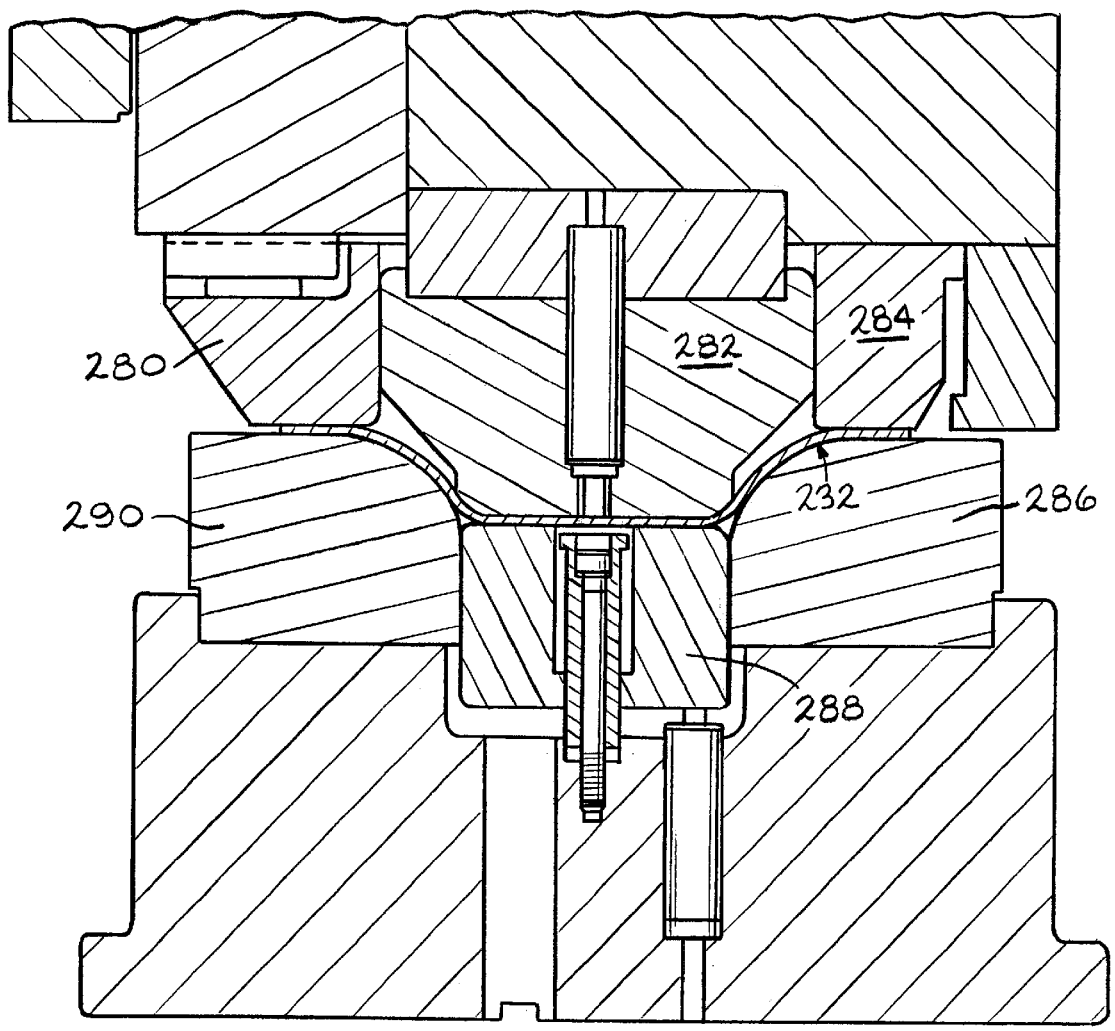
FIG. 27 is a partial sectional view showing the generally bulge bowl shaped wheel disc formed during the initial stamping operation.

Turning to FIG. 19, the sequence of steps for producing the full face fabricated steel vehicle wheel 278 of the present invention will be discussed. Initially, in step 200, a flat sheet of steel material (not shown) is formed into a disc blank 230, shown in FIG. 20. The disc blank 230 defines a generally uniform disc thickness T1. Following this, the disc blank 80 is initially stamped in step 202 to produce a generally "bulge" bowl shaped wheel disc 232, shown in FIGS. 21 and 28. The bulge bowl shaped wheel disc 232 includes an outer annular portion 234, an inner annular wheel mounting portion 236 having a flattened bottom, and an intermediate portion 238 having a generally convex profile. In particular, during the initial stamping operation of step 202, the disc blank 230 is engaged by a plurality of dies, six dies 280, 282, 284, 286, 288, and 290 being illustrated in FIG. 27. During step 202, a first predetermined axial distance F is defined between an inner surface 234A of the outer annular portion 234 and an inner surface 236A of the inner annular portion 236. As will be discussed below, by forming the disc 232 with a shallower generally convex shaped bowl, as compared to the depth and shape of the prior art steel bowl 32 shown in prior art FIG. 3, a smaller blank 230 can be used compared to the size of the prior art blank 30.

Figure 22:
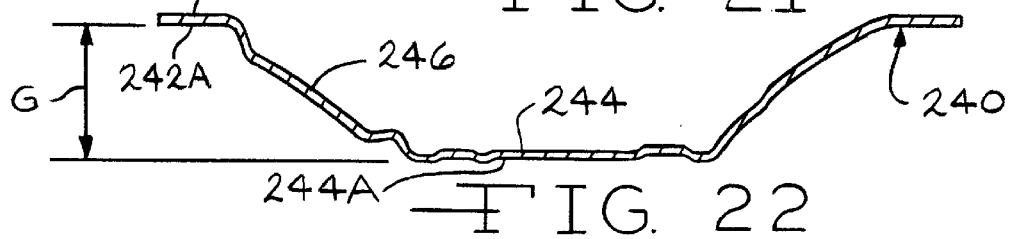
FIG. 22 is a cross sectional view showing the intermediate stamping of the bulge bowl shaped wheel disc to produce a partially formed disc in accordance with this invention.
Figure 28:
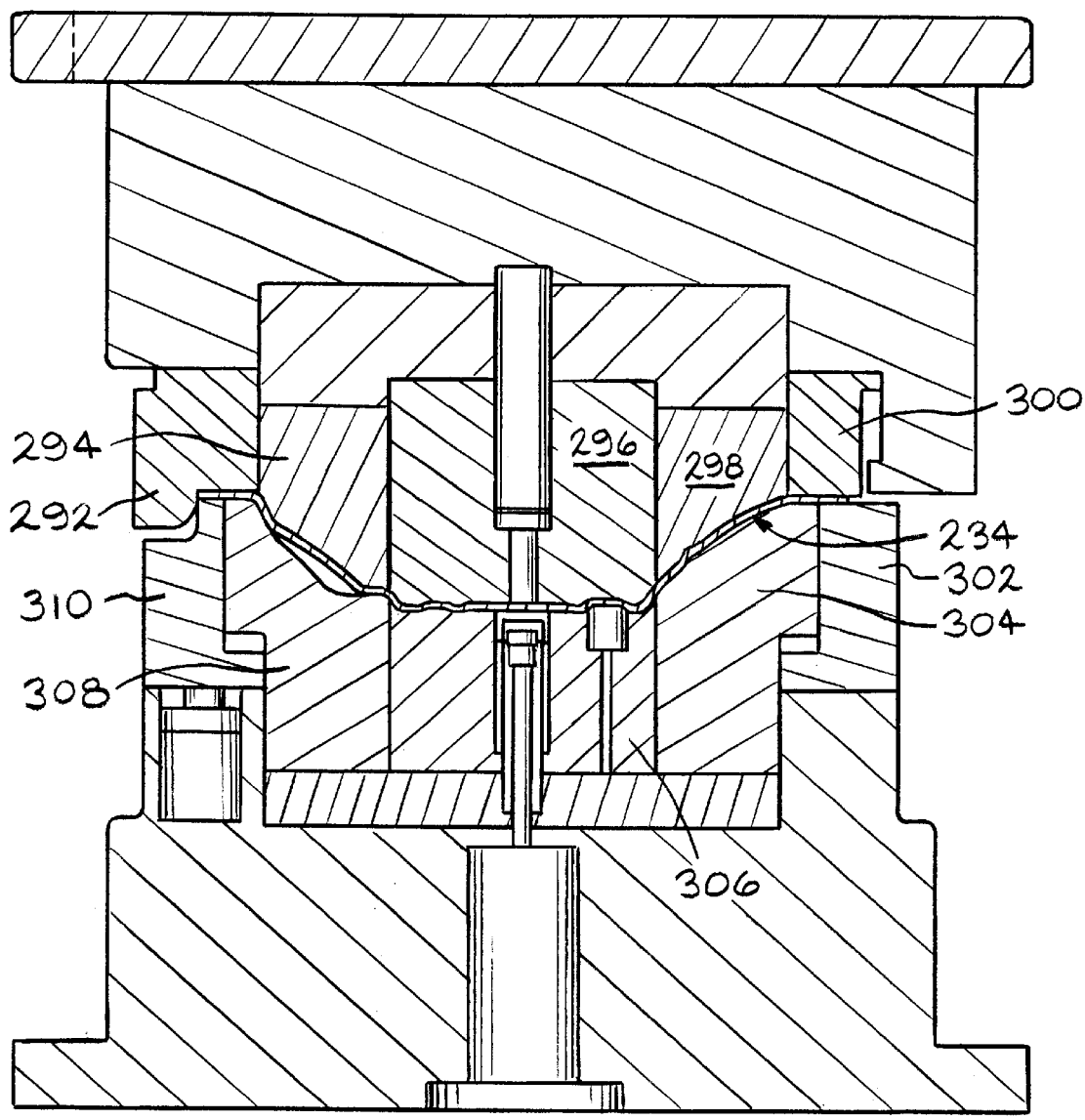
FIG. 28 is a partial sectional view showing the partially formed wheel disc after the intermediate stamping operation.

The bulge bowl shaped disc 232 is then stamped into a partially formed is wheel disc 240 having a predetermined profile, as shown in FIGS. 22 and 28, during step 204. In particular, during step 204, the bulge bowl shaped disc 232 is engaged by a plurality of dies, ten dies 292, 294, 296, 298, 300, 302, 304, 306, 308, and 310 being illustrated in FIG. 28. The wheel disc 240 includes an outer annular portion 242, an inner annular wheel mounting portion 244, and an intermediate portion 246 having a generally convex profile. Also, during step 204, a predetermined second axial distance G is defined between an inner surface 242A of the outer annular portion 242 and an inner surface 244A of the inner annular wheel mounting portion 244. As illustrated, the second predetermined axial distance G is greater than the first predetermined axial distance F. As will be discussed below, the second predetermined axial distance G is preferably a finished part "tread" depth.

Figure 23:
FIG. 23 is a cross sectional view showing the forming of the windows in the partially formed wheel disc in accordance with this invention.
Figure 24:
FIG. 24 is a cross sectional view showing the trimming of the outer diameter of the partially formed wheel disc in accordance with this invention.
Figure 25:
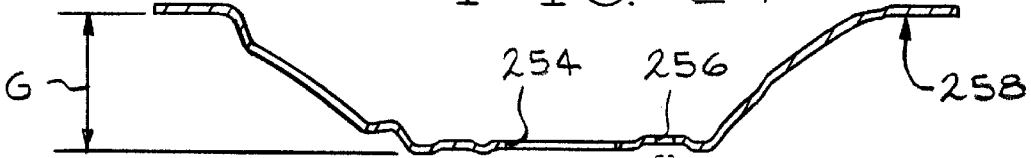
FIG. 25 is a cross sectional view showing the forming of the hub hole and lug bolt mounting holes in the partially formed wheel disc in accordance with this invention.
Figure 26:
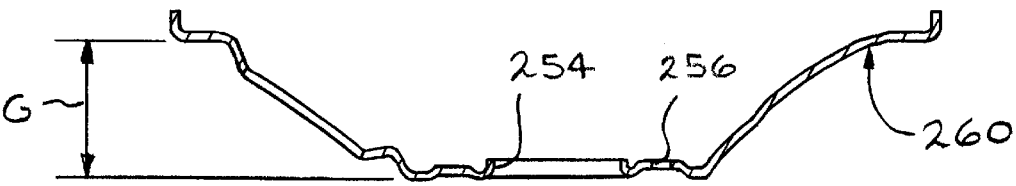
FIG. 26 is a cross sectional view showing the final stamping of the partially formed wheel disc to produce a finished full face fabricated steel wheel disc in accordance with this invention.
Figure 29:
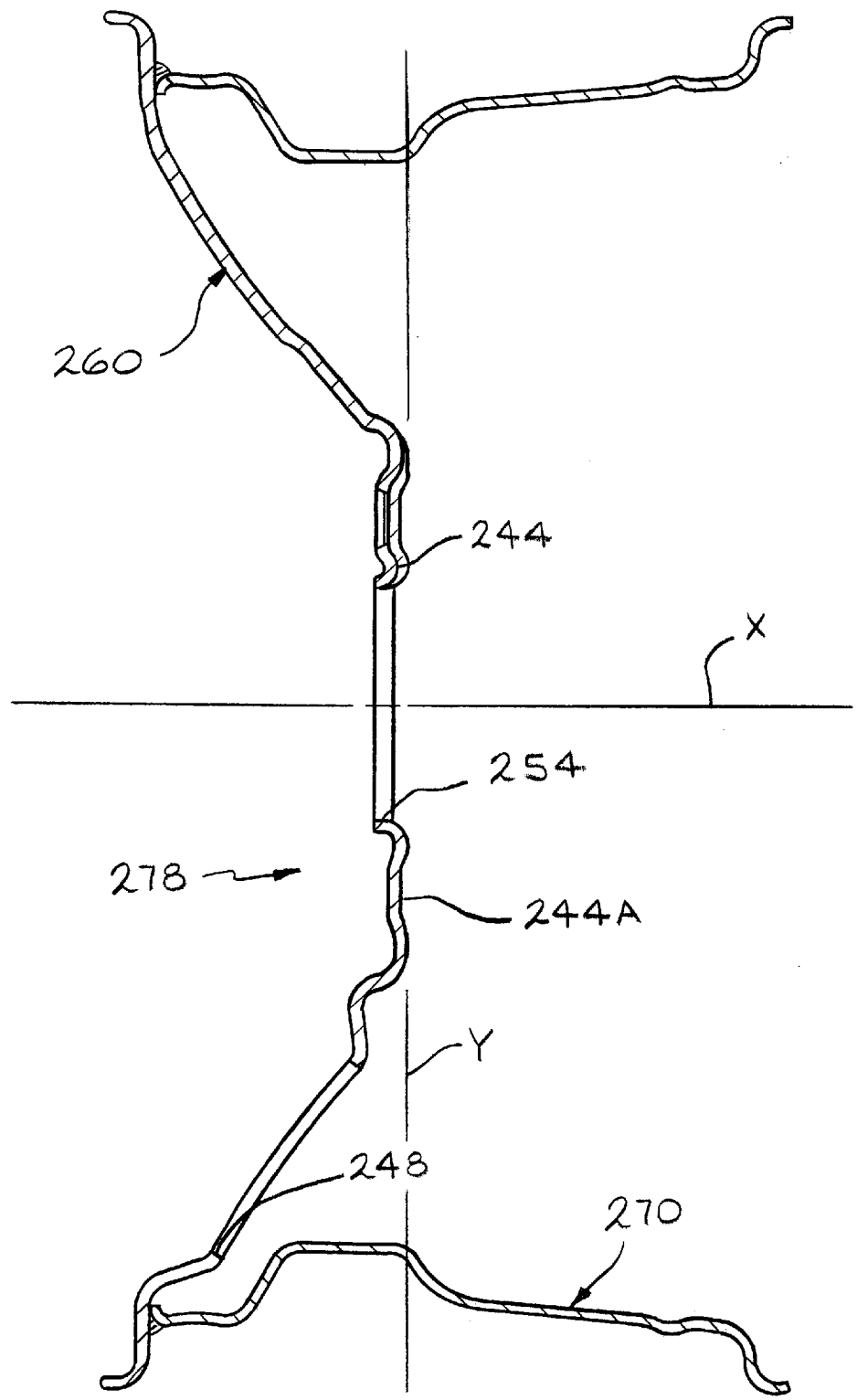
FIG. 29 is a sectional view of a full face fabricated steel vehicle wheel in produced in accordance with this invention.

Next, during step 206, a plurality of windows 248 (only one window illustrated in FIG. 23) are formed in the wheel disc 240 to produce a partially formed disc 250. Following this, in step 208, the windows 248 are coined and an outer edge of the partially formed disc 250 is trimmed to a predetermined diameter during step 208 to produce a partially formed wheel disc 252 shown in FIG. 24. Next, in step 210, a center hub hole 254 and a plurality of lug bolt mounting holes 256 (only one hole 256 is illustrated in FIG. 25) are formed in the disc 252 to produce a partially formed disc 258 as shown in FIG. 25. Following this, the partially formed disc 258 is restriked and then subjected to a final stamping operation during step 212 to produce a finished full face steel wheel disc 260 shown in FIG. 26. Following this, the full face steel wheel disc 260 is secured to a partial steel wheel rim, indicated generally at 270 in FIG. 29, during step 214 to produce the finished full face fabricated steel vehicle wheel 278 shown in FIG. 29 of the present invention. As shown in FIG. 29, the wheel rim 270 defines a generally horizontal or longitudinal axis X and the inner surface 244A of the inner annular wheel mounting portion 244 of the wheel disc 260 defines a generally vertical axis Y which is generally perpendicular to the rim axis X.

Figure 30:
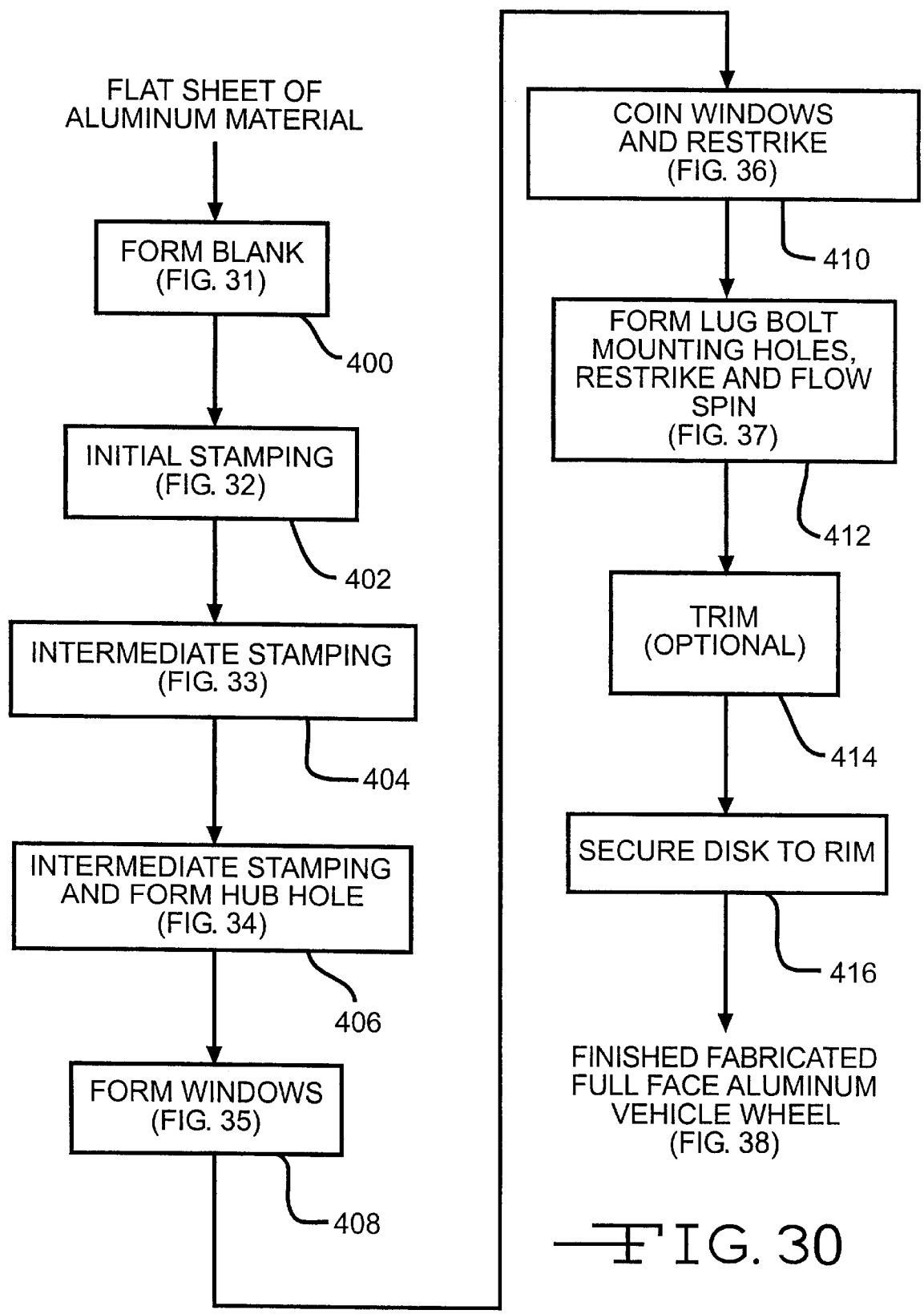
FIG. 30 is a block diagram illustrating a sequence of steps for producing a full face fabricated aluminum vehicle wheel in accordance with the present invention.

Referring now to FIG. 30, there is illustrated a block diagram showing a sequence of steps for producing a second embodiment of a fabricated vehicle wheel in accordance with the present invention. The vehicle wheel produced according to this sequence of steps is illustrated as being a full face fabricated aluminum vehicle wheel, indicated generally at 480 in FIG. 38. However, it will be appreciated that the present invention can be used in conjunction with other types of fabricated vehicle wheels having an aluminum wheel disc. For example, the vehicle wheel can be a "bead seat attached" wheel (such as shown in FIG. 4 of U.S. Patent No. 5,188,429 to Heck et al.), a "well attached" wheel (such as shown in FIG. 3 of Heck et al.), a "bimetal" wheel construction including an aluminum disc and a steel rim (such as shown in U.S. Pat. No. 5,421,642 to Archibald), or a "modular wheel" construction including a "partial" rim and a fill face wheel disc (such as shown in U.S. Pat. No. 5,360,261 to Archibald et al.), all of these patents incorporated herein by reference.

Figure 31:
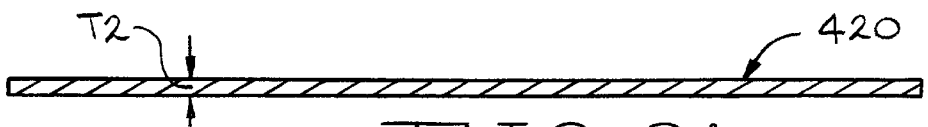
FIG. 31 is a cross sectional view of the disc blank for use in producing the full face fabricated aluminum vehicle wheel in accordance with this invention.
Figure 32:
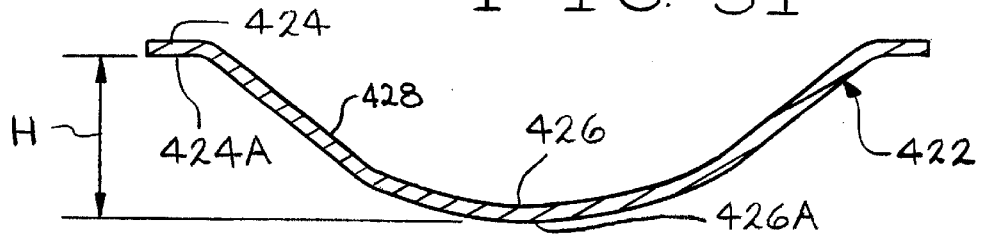
FIG. 32 is a cross sectional view showing the initial stamping of the disc blank into a partially formed wheel disc in accordance with this invention.
Figure 33:
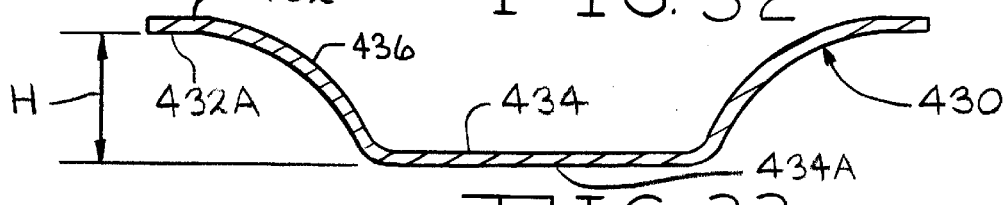
FIG. 33 is a cross sectional view showing the intermediate stamping of the wheel disc to produce a partially formed wheel disc having a generally bulge bowl shape in accordance with this invention.

Turning now to FIG. 30, the sequence of steps for producing the full face fabricated aluminum vehicle wheel 480 of the present invention will be discussed. Initially, in step 400, a flat sheet of aluminum material (not shown) is formed into a disc blank 420 as shown in FIG. 31. The disc blank 420 defines a generally uniform disc thickness T2. Following this, the disc blank 420 is initially stamped in step 402 to produce a generally straight bowl shaped wheel disc 422, shown in FIG. 32. The straight bowl shaped wheel disc 422 includes an outer annular portion 424, an inner annular portion 426 having a curved bottom, and an intermediate portion 428 having a generally straight profile. During step 402, a first predetermined axial distance H is defined between an inner surface 424A of the outer annular portion 424 and an inner surface 426A of the inner annular portion 426. Following this, in step 404, the wheel disc 42 is then is stamped into a partially formed wheel disc 430 having a predetermined profile, as shown in FIG. 33. The partially formed wheel disc 430 includes an outer annular portion 432, an inner annular wheel mounting portion 434, and an intermediate portion 436 having a generally convex profile. Also, during step 402, the predetermined axial distance H is maintained between an inner surface 432A of the outer annular portion 432 and an inner surface 434A of the inner annular wheel mounting portion 434. Alternatively, in step 402, the intermediate portion 428 can be formed with a generally convex profile and/or the axial distance H between surfaces 424A and 426A can be less than the axial distance H between surfaces 432A and 434A in a manner similar to that described above in connection with FIGS. 21 and 22.

Figure 34:
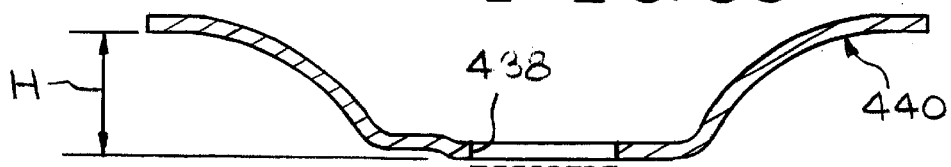
FIG. 34 is a cross sectional view showing the intermediate stamping and the forming of the hub hole in the partially formed wheel disc in accordance with this invention.
Figure 35:
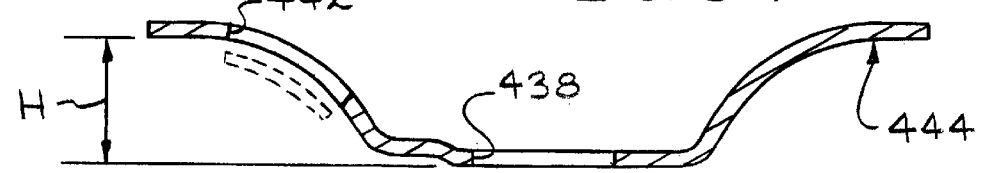
FIG. 35 is a cross sectional view showing the forming of the windows in the partially formed wheel disc in accordance with this invention.
Figure 36:
FIG. 36 is a cross sectional view showing the coining of the back side of the windows and the restriking of the hub hole in the partially formed wheel disc in accordance with this invention.

Next, during step 402, the partially formed wheel disc 430 is subjected to one or more stamping operations and a center hub hole 438 is formed in the wheel disc 430 to produce a partially formed wheel disc 440 shown in FIG. 34. Following this, a plurality of windows 442 (only one window 442 is illustrated in FIG. 35) are formed in the partially formed disc 440 during step 408 to produce a partially formed wheel disc 444. In step 410, the windows 442 are coined and the wheel disc 444 is restriked to produce a partially formed wheel disc 446 shown in FIG. 36.

Figure 37:
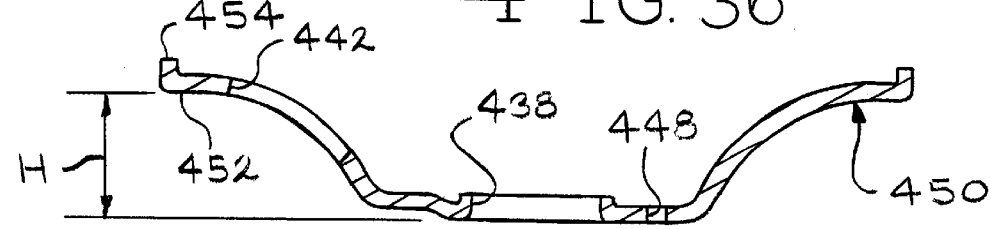
FIG. 37 is a cross sectional view showing the forming of the lug bolt mounting holes, the restriking of the wheel disc, and the flow spinning of the partially formed wheel disc in order to produce a finished full face fabricated aluminum wheel disc in accordance with this invention.

In step 412, a plurality of lug bolt mounting holes 448 (only one hole 448 is illustrated in FIG. 37) are formed in the wheel disc 446, the wheel disc 446 is restriked, and then the wheel disc 446 is preferably subjected to a final flow spinning operation to produce a finished full face aluminum wheel disc 450 shown in FIG. 37. The wheel disc 450 includes a generally radially outwardly extending outer annular end portion 452 which defines the outboard tire bead seat retaining flange of the full face fabricated vehicle wheel 480.

Next, in optional step 41, an outer end portion 454 of the outboard tire bead seat retaining flange 452 is subjected to a trimming operation to provide a smooth tire flange radius. Alternatively, the disc wheel 446 may be subjected to a final stamping operation in step 412 instead of the flow spinning operation. When the disc 446 is subjected to a final stamping operation in step 412, the trimming operation of optional step 414 is usually performed.

Figure 38:
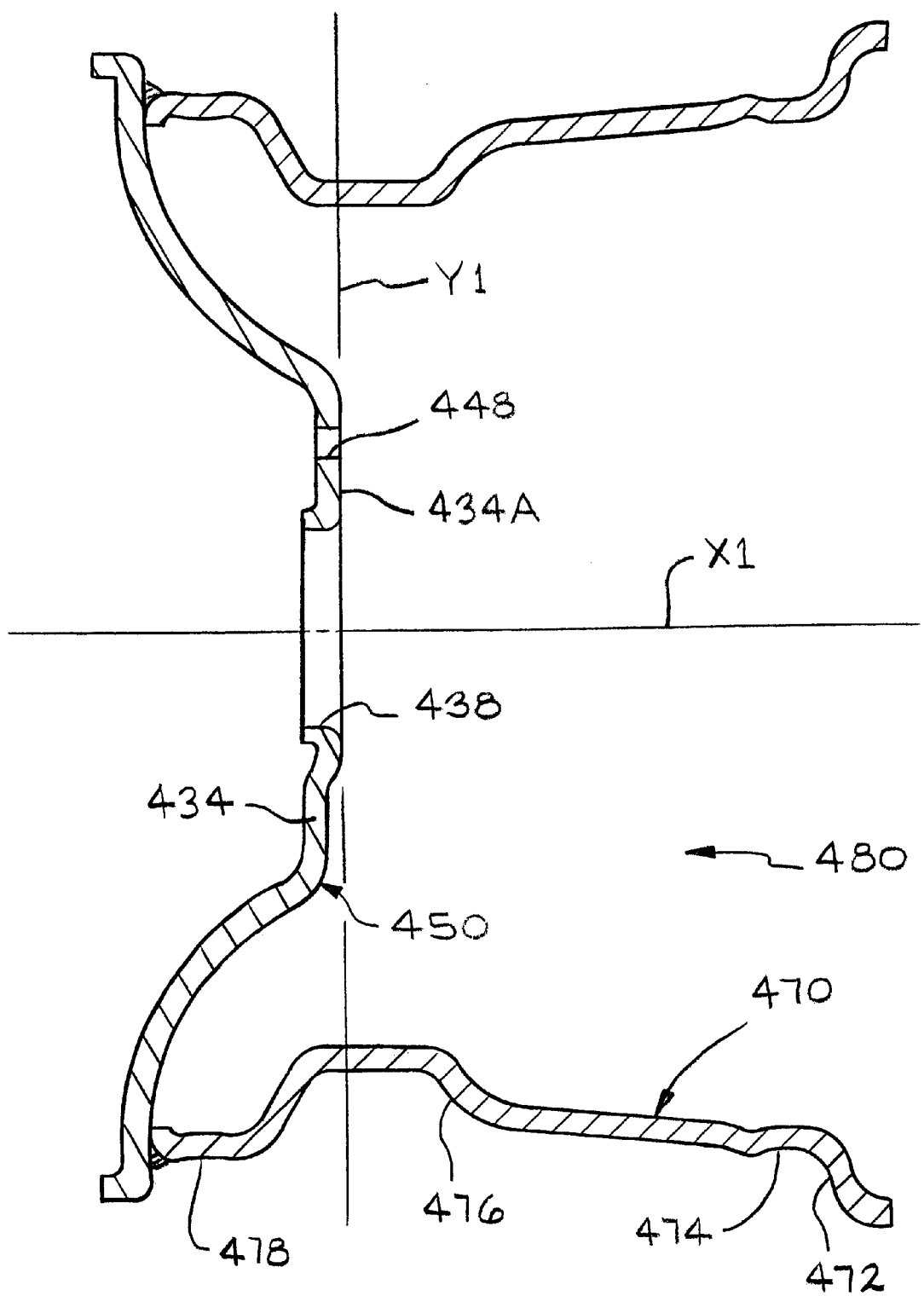
FIG. 38 is a sectional view of a fill face fabricated aluminum wheel produced in accordance with this invention.

Following this, the finished full face aluminum wheel disc 450 is secured to a partial aluminum wheel rim 470, shown in FIG. 38, having a predetermined shape in step 416. As shown therein, the wheel rim 470 includes an inboard tire bead seat retaining flange 472, an inboard tire bead seat 474, a generally axially extending well 476, and an outboard tire bead seat 478. In particular, during step 416, the outboard tire bead seat 438 of the wheel rim 470 is positioned adjacent the outboard tire bead seat retaining flange 452 of the wheel disc 450, and a circumferentially extending continuous, air-tight weld 482 is applied to secure the wheel rim 470 and wheel disc 450 together to produce the finished full face fabricated aluminum vehicle wheel 480 of the present invention. As shown in FIG. 38, the wheel rim 470 defines a generally horizontal or longitudinal axis XI and the inner surface 434A of the inner annular wheel mounting portion 434 of the wheel disc 450 defines a generally vertical axis Y1 which is generally perpendicular to the rim axis XI.

In accordance with the provisions of the patent statutes, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A method for forming a full face fabricated steel vehicle wheel comprising the steps of:

(a) providing a partial wheel rim formed from steel and defining a generally horizontal rim axis and including a generally axially extending well portion and a pair of opposed ends, one of the ends including an inboard tire bead seat retaining flange and an inboard tire bead seat, and the other end including an outboard tire bead seat;

(b) providing a generally circular wheel disc blank formed from steel and including an inner annular wheel mounting portion and an outer annular portion, the inner annular wheel mounting portion including an inner surface which defines a generally vertical disc axis which is generally perpendicular to the horizontal rim axis;

(c) subjecting the wheel disc blank to a series of metal forming operations to produce a finished full face wheel disc having a final profile, the finished full face wheel disc having an outer annular portion, an inner annular wheel mounting portion, and an intermediate portion extending between the outer annular portion and the inner annular portion, the intermediate portion having a generally convex profile with respect to the vertical disc axis as viewed in an outboard facing direction and which extends throughout the entire length thereof from about the outer annular portion to about the inner annular portion, the series of metal forming operations including the steps of:

(c1) initially stamping the steel disc blank to produce an initially formed full face steel wheel disc having a generally straight or convex shaped intermediate bowl and defining a first axial distance between an inner surface of the outer annular portion and an inner surface of the inner annular wheel mounting portion;

(c2) subjecting the initially formed full face steel wheel disc to an intermediate metal forming operation to produce a partially formed fill face steel wheel disc having a generally convex shaped intermediate bowl and defining a second axial distance between the inner surface of the outer annular portion and the inner surface of the inner annular wheel mounting portion, the second axial distance being greater than the first axial distance;

(c3) subjecting the partially formed full face steel wheel disc to a final metal forming operation to produce a fmished full face steel wheel disc having a predetermined disc profile including a generally convex shaped intermediate bowl and defining a third axial distance between the inner surface of the outer annular portion and the inner surface of the inner annular wheel mounting portion, the third axial distance being generally equal to the second axial distance; and (d) joining the finished full face steel wheel disc to the partial steel wheel rim by welding to produce the full face fabricated steel vehicle wheel.

2. The method according to claim 1 wherein step (c1) includes initially stamping the steel disc blank to produce an initially formed fill face steel wheel disc having a generally convex shaped intermediate bowl.

3. The method according to claim 1 wherein step (c) includes forming a center hub hole in the disc blank.

4. The method according to claim 1 wherein step (c) includes forming a plurality of windows in the disc blank.

5. The method according to claim 4 wherein step (c) includes coining the windows.

6. The method according to calim 1 wherein step (c) includes forming a plurality of lug bolt mounting holes in the disc blank.

7. A method for forming a full face fabricated steel vehicle wheel comprising the steps of:

(a) providing a partial steel wheel rim defining a generally horizontal rim axis and including a generally axially extending well portion and a pair of opposed ends, one of the ends including an inboard tire bead seat retaining flange and an inboard tire bead seat, and the other end including an outboard tire bead seat;

(b) providing a generally circular steel wheel disc blank including an inner annular wheel mounting portion and an outer annular portion, the inner annular wheel mounting portion including an inner surface which defines a generally vertical disc axis which is generally perpendicular to the horizontal rim axis;

(c) subjecting the steel wheel disc blank to an initial stamping operation to produce an initially formed full face steel wheel disc having an outer annular portion, an inner annular wheel mounting portion, and an intermediate portion extending between the outer annular portion and the inner annular portion, the intermediate portion having a generally convex profile with respect to the vertical disc axis as viewed in an outboard facing direction and which extends throughout the entire length thereof from about the outer annular portion to about the inner annular portion, the initially formed full face steel wheel disc having a first axial distance defined between an inner surface of the outer annular portion and an inner surface of the inner annular wheel mounting portion;

(d) subjecting the initially formed full face steel wheel disc to at least one intermediate metal forming operation to produce a partially formed full face steel wheel disc having a generally convex shaped intermediate bowl, the partially formed full face steel wheel disc having a second axial distance defined between the inner surface of the outer annular portion and the inner surface of the inner annular wheel mounting portion, the second axial distance is greater than the first axial distance;

(e) subjecting the partially formed full face steel wheel disc to a final metal forming operation to produce a finished full face steel wheel disc having a predetermined disc profile including a generally convex shaped intermediate bowl, the finished full face steel wheel disc having a third axial distance defined between the inner surface of the outer annular portion and the inner surface of the inner annular wheel mounting portion, wherein the third axial distance is greater than the first axial distance; and (f) joining the finished fill face steel wheel disc to the partial steel wheel rim to produce the full face fabricated steel vehicle wheel.

8. The method according to claim 7 wherein the second axial distance is generally to the third axial distance.

9. The method according to claim 7 wherein one of steps (c), (d) and (e) includes the step of forming a center hub hole in the wheel disc.

10. The method according to claim 7 wherein one of steps (c), (d) and (e) includes the step of forming a plurality of windows in the wheel disc.

11. The method according to claim 7 wherein one of the steps (c), (d) and (e) includes the step of forming a plurality of lug bolt mounting holes in the wheel disc.

12. A method for forming a full face fabricated aluminum vehicle wheel comprising the steps of:

(a) providing a partial wheel rim formed from aluminum and defining a generally horizontal rim axis and including a generally axially extending well portion and a pair of opposed ends, one of the ends including an inboard tire bead seat retaining flange and an inboard tire bead seat, and the other end including an outboard tire bead seat;

(b) providing a generally circular wheel disc blank formed from aluminum and including an inner annular wheel mounting portion and an outer annular portion, the inner annular wheel mounting portion including an inner surface which defines a generally vertical disc axis which is generally perpendicular to the horizontal rim axis;

(c) subjecting the wheel disc blank to a series of metal forming operations to produce a finished full face wheel disc having a fmal profile, the finished full face wheel disc having an outer annular portion, an inner annular wheel mounting portion, and an intermediate portion extending between the outer annular portion and the inner annular portion, the intermediate portion having a generally convex profile with respect to the vertical disc axis as viewed in an outboard facing direction and which extends throughout the entire length thereof from about the outer annular portion to about the inner annular portion, the series of metal forming operations including the steps of:

(c1) initially stamping the aluminum disc blank to produce an initially formed full face aluminum wheel disc having a generally straight or convex shaped intermediate bowl and defining a first axial distance between an inner surface of the outer annular portion and an inner surface of the inner annular wheel mounting portion;

(c2) subjecting the initially formed fill face aluminum wheel disc to an intermediate metal forming operation to produce a partially formed full face aluminum wheel disc having a generally convex shaped intermediate bowl and defining a second axial distance between the inner surface of the outer annular portion and the inner surface of the inner annular wheel mounting portion, the second axial distance being greater than the first axial distance;

(c3) subjecting the partially formed full face aluminum wheel disc to a final metal forming operation to produce a finished full face aluminum wheel disc having a predetermined disc profile including a generally convex shaped intermediate bowl and defining a third axial distance between the inner surface of the outer annular portion and the inner surface of the inner annular wheel mounting portion, the third axial distance being generally equal to the second axial distance; and (d) joining the finished full face wheel aluminum disc to the partial wheel rim by welding to produce the full face fabricated aluminum vehicle wheel.

13. The method according to claim 12 wherein step (c) includes forming a center hub hole in the disc blank.

14. The method according to claim 12 wherein step (c) includes forming a plurality of windows in the disc blank.

15. The method according to claim 14 wherein step (c) includes coining the windows.

16. The method according to claim 14 wherein step (c) includes forming a plurality of lug bolt mounting holes in the disc blank.

* * * * *